United States Patent [19]

Ando et al.

[11] Patent Number: 4,502,061

[45] Date of Patent: Feb. 26, 1985

[54] IMAGE FORMING APPARATUS

[75] Inventors: Yujiro Ando; Haruo Fujii, both of Yokohama, Japan

[73] Assignee: Canon Kabushiki Kaisha, Tokyo, Japan

[21] Appl. No.: 417,468

[22] Filed: Sep. 13, 1982

[30] Foreign Application Priority Data

| | | | |
|---|---|---|---|
| Sep. 22, 1981 | [JP] | Japan | 56-149740 |
| Dec. 15, 1981 | [JP] | Japan | 56-203340 |
| May 19, 1982 | [JP] | Japan | 57-84169 |

[51] Int. Cl.[3] .............................................. G01D 15/06

[52] U.S. Cl. .............................. 346/153.1; 355/3 DD

[58] Field of Search ........................... 355/3 R, 3 DD; 346/74.2, 74.5, 153.1; 118/656, 657, 658, 661

[56] References Cited

U.S. PATENT DOCUMENTS

| | | | |
|---|---|---|---|
| 3,946,404 | 3/1976 | Berkowitz et al. | 346/74.5 |
| 4,142,192 | 2/1979 | Ochi | 346/74.2 |
| 4,316,198 | 2/1982 | Erickson | 118/658 X |
| 4,391,512 | 7/1983 | Nakamura et al. | 118/657 X |
| 4,446,471 | 5/1984 | Yano | 346/153.1 |

*Primary Examiner*—Fred L. Braun

*Attorney, Agent, or Firm*—Fitzpatrick, Cella, Harper & Scinto

[57] ABSTRACT

A novel image recording system using particulate developer. The particulate developer is accumulated in a container. A developer carrying member is disposed movably in contact with the accumulated developer. At the position where the particulate developer is to be flowed out from the container onto the carrying member there is provided a gate member. An important feature of the invention resides in the function of this gate member. To the gate member is given an action force which normally intends to block the flow of the developer from the container to the carrying member. Only when a record of image is formed, the developer is imagewisely put on the carrying member against the blocking force thereby forming a recorded image on the carrying member at the downstream side of the gate member.

11 Claims, 7 Drawing Figures

IMAGE FORMING APPARATUS

BACKGROUND OF THE INVENTION

1. Field of the Invention

The present invention relates an image forming method and apparatus for carrying out the same. More specifically, the present invention relates to a method and apparatus for forming images on a developer carrying member by controlling the adhesion of particulate developer to the carrying member according to imagewisely formed electric signals.

2. Description of the Prior Art

An image recording method generally called contrography is known in the art wherein developer is directly adhered to a recording member by means of electric signal. According to the known contrographic method, liquid developer is applied onto a recording material and the liquid developer is imagewisely adhered to the recording material under the action of needle electrodes. However, the method involves a problem that the liquid carrier permeates the recording material. Because of this problem, this method has been found to be unacceptable for practical purposes.

As another contrographic method there is also known such image recording method which uses dry developer and needle electrodes disposed in contact with a recording material. The dry developer is applied onto the recording member from the opposite side to the needle electrodes. This method also has some disadvantages. The resolution of the formed image varies depending on the thickness and electroconductivity of the recording material then used. The resolution often decreases down a great extent. According to the method, therefore, it has been impossible to obtain satisfactory image quality.

SUMMARY OF THE INVENTION

Accordingly it is an object of the invention to provide a novel image recording method and apparatus which overcomes the problems involved in the prior art mentioned above.

It is another object of the invention to provide an image recording method and apparatus which enables the use of dry developer and which obtains images of high resolution without being affected by the atmospheric conditions such as moisture.

It is a further object of the invention to provide an image recording apparatus which enables the recording of images employing lower voltage.

To attain the above objects according to the invention, an amount of electroconductive particulate developer is accumulated above a moving developer carrying member. The carrying member is moved relative to the accumulation of developer. At a position downstream of the carrying member there is provided a gate member for the accumulated developer. The gate member is so formed as to allow the developer to imagewisely pass through the gate. To the gate member is given an action force which normally acts to block the flow of developer toward the carrying member. At recording, the developer is adhered to the carrying member by the gate member thereby forming a recorded image by the pattern of developer which flows onto the carrying member.

Various kinds of developer may be used in the invention. For example, there may be used one component developer comprising electroconductive or dielectric magnetic toner and two component developer comprising non-magnetic toner and magnetic carrier.

The action force given to the gate member to block the outflow of developer may be a magnetic field or an electric field formed between the gate member or other member adjacent to it and the developer carrying member.

The gate member used in the invention may have any suitable form for controlling the outflow of developer at the outlet portion of accumulating means. For example, the gate member may be formed of a number of electrodes arranged in a row across the record width with the density of about 5 to 15 electrodes/mm and with the relation of being electrically isolated from each other.

Other and further objects, features and advantages of the invention will appear more fully from the following description.

DETAILED DESCRIPTION OF THE PREFERRED EMBODIMENTS

Hereinafter, some preferred embodiments of the invention will be described with reference to the accompanying drawings.

Figure 1:
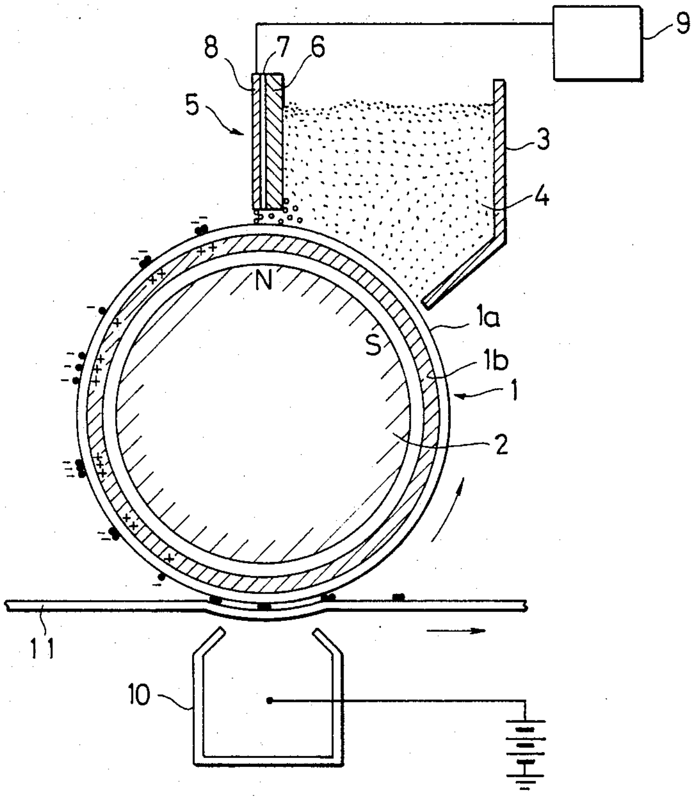
FIG. 1 is a sectional view of a recording apparatus showing an embodiment of the invention.

Referring first to FIG. 1 there is shown a first embodiment of image recording apparatus according to the invention.

The developer used in the embodiment is one component electroconductive magnetic toner (hereinafter the developer is referred to briefly as toner).

In FIG. 1, a cylindrical toner carrying member 1 rotates in the direction of arrow. The toner carrying member is composed of an electroconductive non-magnetic cylinder **1*b* made of aluminum or brass and a dielectric thin layer 1*a* coated on the cylinder 1*b*. The cylinder 1*b* is grounded. The carrying member 1 has a stationary magnet 2 disposed within the cylinder 1*b*. An amount of toner 4 is accumulated in a toner container 3. 5 is a gate member for controlling the outflow of toner from the container 3**.

The gate member 5 is composed of a support 6, an insulating layer 7 and a number of electrodes 8. The support 6 is formed of magnetic or non-magnetic material. The electrodes 8 are bonded to the support 6 through the insulating layer 7. These electrodes 8 are made of magnetic material and arranged in a row across the full width of the carrying member 1. These electrodes are electrically isolated from each other and individually connected to a signal source 9. The stationary magnet 2 in the carrying member has a magnetic pole opposed to the gate member 5 so that a strong magnetic field is formed between the magnet 2 and the electrodes 8 formed of magnetic material. The toner 4 are bound by the magnetic field at the gate part. The binding force is so selected that the developer cannot flow out past the gate member with the rotation of the toner carrying member 1. In this embodiment, the electrodes 8 are formed of permalloy wire of 60μ in diameter.

The manner of operation of this embodiment is as follows:

When an imagewisely controlled voltage is applied to the electrodes 8 from the signal source 9, a current flows toward the carrying member from those electrodes 8 to which the voltage is being applied, through the electroconductive magnetic toner. As a result, through the surface insulating layer 1*a*, the electroconductive cylinder 1*b* is charged with electric charge of opposite polarity to that of the charge on the toner. Thus, an electrostatic attraction force acts on the toner. The force of the magnetic field formed at the gate portion to block the outflow of toner is therefore overcome by the electrostatic attraction force. The toner selectively and imagewisely flows out onto the surface of the carrying member and adhered to the latter thereby forming a recorded image on the surface. When the insulating layer 1*b* on the carrying member 1 is sufficiently thin, a strong electrostatic attraction force can be obtained even if the applied voltage to the electrodes 8 is low. For this reason, it is preferable that the thickness of the insulating layer 1*b* be less than several microns. The insulating layer satisfying the requirement may be obtained by an insulating thin layer of resin, metal oxide and the like. It has been found that a thin coating film formed by anodic oxidization of aluminum and that impregnated with fluoro resin are particularly suitable.

To improve the repeating usability of the toner carrying member it is desirable that the charge on the toner be discharged within one revolution period of the carrying member to avoid the accumulation of charge on the member. The material of the toner carrying member is always subjected to friction with toner. Therefore, it is advisable that such material having lower surface energy, for example, silicone be used for the carrying member to minimize the frictional resistance to toner and to provide good lubricity.

The toner image formed on the toner carrying member 1 is then transferred onto a recording member such as a transfer paper sheet 11 under the action of suitable electric application means such as a corona discharger 10. After transferring, the toner image is fixed on the transfer paper for final use.

The untransferred toner image remaining on the toner carrying member is erased before it passes through the gate member the next time. Therefore, in general, it is unnecessary to provide particular cleaning means. However, in the case where thermal transfer means is used in the apparatus, the toner will be made unsuitable for reuse. In such case there may be provided cleaning means such as a cleaning blade formed of rubber, plastics or metal so as to clean off the remaining toner on the carrying member.

It has been found that an additional effect can be obtained by using a magnetic material for the toner outlet portion of the toner container 3 adjacent to the carrying member so as to provide a magnetic pole there in opposition to the magnetic pole part of the stationary magnet 2. In this case, the polarity of the magnetic pole at the toner outlet portion is opposite to that of the magnetic pole of the magnet 2. This structure serves to prevent the outflow of magnetic toner from the container and also to clean off the remaining toner image at the same time.

Figure 2:
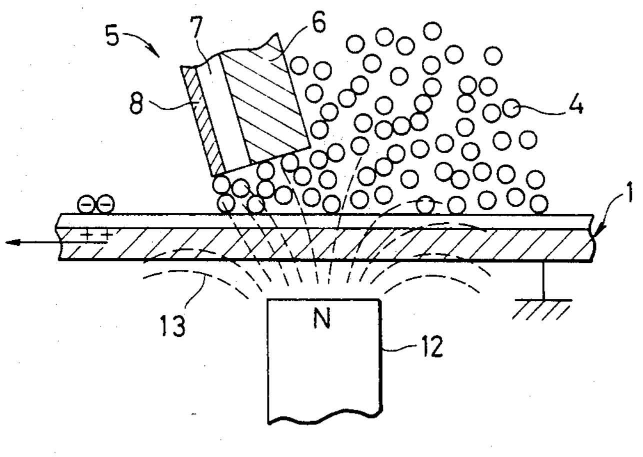
FIG. 2 is a partly enlarged sectional view of the gate part of the apparatus.

As will be seen from the above, according to the invention, it is required to inhibit the outflow of toner beyond the gate member at all times except during image formation. To achieve this, the shape of the binding magnetic field formed at the position of the gate member is particularly important. FIG. 2 shows a concrete example of the arrangement of magnetic poles effective for preventing the outflow of toner at the area of the gate member. In FIG. 2, like reference characters to FIG. 1 represent the functionally same elements.

In the arrangement shown in FIG. 2, the magnetic electrodes 8 are disposed not in the position rightly opposed to the magnetic pole of the stationary magnet 12 through the toner carrying member 1 but disposed in a position a little shifted from the above position toward the side on which the developer is accumulated. Broken lines 13 indicate the lines of magnetic force in this arrangement. It has been found that when lines of magnetic force as shown in FIG. 2 are obtained, good effect to prevent the outflow of toner can be attained. The formed magnetic field is inclined in the counter direction to the moving direction of toner carrying member. It has been found that the effect to prevent the outflow of toner becomes more perfect with increasing the inclination relative to the stationary magnet 12. However, on the other hand, the distance between the carrying member 1 and the array of electrodes 8 increases with increasing the inclination of the magnetic field. In our experiments, it has been found that when the distance is large, there occurs such phenomenon that the toner particles bind one to another to form a long chain of toner extending along the magnetic field between the two members. In the apparatus according to the invention, when a voltage for recording is applied to the electrodes, the current is apt to flow along such chain of toner particles. Therefore, if there is too much inclination and too long a chain of toner, then the potential reaching the toner carrying member drops down, which in turn reduces the resolution of the formed image. In some cases it was required to increase the applied voltage to the electrodes 8.

Furthermore, when the inclination of the magnetic field is too large, it brings about another problem that after an imagewise voltage has been applied and an amount of toner has been taken out from the gap between the gate member and the carrying member to form a toner image, the gap can not be filled again with toner in a short time. Considering these limitations, we have found that the inclination of the magnetic field, that is, the angle which the direction of the magnetic field forms with a line perpendicular to the surface of the toner carrying member, should be preferably in the range of about 0° to 60° and more preferably 30° to 45°.

The size of the gap between the gate member and the carrying member is determined by the particle size of the toner then used. For toner usually used for electrophotography, the gap size may be in the range of 40 to 200μ. A particularly suitable range of the gap size is in the range of 60 to 100μ. The preferred range of magnetic field at the gap is 300 to 2000 gauses. About 850 gauses is particularly suitable. The standard voltage applied to the gate electrodes may be 50V under the conditions of the thickness of the insulating layer: 1μ; the ohmic resistance of toner: $10^8$ Ωcm and the gap size: about 100μ.

The applied voltage should be so set as not to generate any spark discharge.

While the embodiment has been shown and described as that using electroconductive magnetic toner, there may be used also dielectric magnetic toner to form a toner image on the toner carrying member in the same manner as above. However, in the case of dielectric magnetic toner, a higher applied voltage is generally required. Also, it has been observed that the toner is apt to adhere to the carrying member by the mirror image force of the charged toner and sometimes fogging is produced in the visualized image.

Various means may be employed to prevent such fogging. For example, a voltage of opposite porality to that of the toner may be applied to the gate electrodes to keep the gate part in the state densely packed with toner. Another effective method is to cover the surface of the toner carrying member with such material which can be charged with the same polarity charge as the friction charge produced by the friction with the toner. As another means, the shape of the gate member may be suitably modified so as to increase the toner binding force by the gate member. This may be attained, for example, by forming the support 6 of the gate member employing a magnetic substance.

As to the processing of the toner image formed on the carrying member, various modification are possible in the above embodiment. For example, to transfer the toner image there may be used various other known transfer methods such as electrostatic transferring using roller, pressure transferring and thermal transferring. Also, a sheet may be used as the toner carrying member as shown in FIG. 2. In this case, the toner may be fixed directly on the sheet without transferring and the sheet bearing the toner image fixed thereto may be used as a final record.

Figure 3:
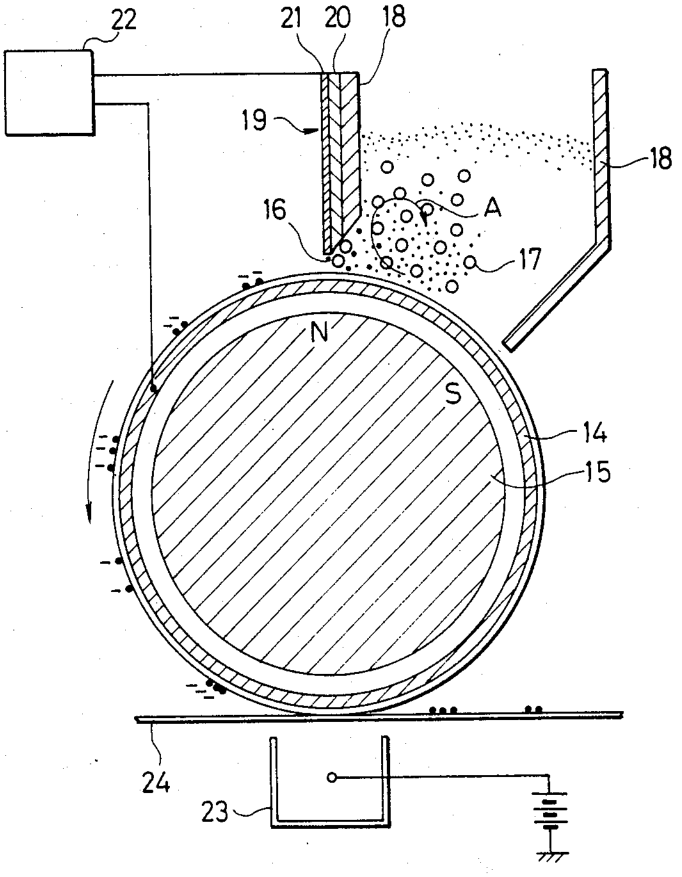
FIG. 3 is a sectional view of a recording apparatus showing another embodiment of the invention.

FIG. 3 shows a second embodiment of the invention wherein two-component developer comprising toner and carrier is used.

In this embodiment, the toner carrying member 14 is composed of an electroconductive non-magnetic cylinder covered with a resin film or coated with resin to form an insulating thin layer on the surface of the cylinder. 15 is a stationary magnet disposed within the cylindrical carrying member 14. The carrying member 14 rotates in the direction of arrow but the magnet 15 remains fixed in position. Toner 16 and magnetic carrier 17 are mixed together and the mixture is accumulated in a toner container 18 in the form of a hopper which serves as the same toner accumulation means as that in the first embodiment. 19 is a gate member comprising an array of electrodes 21 bonded to the downstream side wall of the container 18 through an insulating layer 20. The electrode array extends in the direction parallel to the rotation axis of the carrying member. Every electrode 21 in the electrode array is formed of magnetic material and is connected to a signal source 22. The structure and arrangement of the electrodes 21 correspond to those of the electrodes in the first embodiment shown in FIG. 1. The stationary magnet 15 has a magnetic pole N in opposition to the gate member 18. Therefore, a strong magnetic field is formed between the electrode array 21 and the magnetic pole on the stationary magnet 15. The magnetic carrier 17 is bound by the magnetic field and can not be carried from the container by the rotating toner carrying member 14. Toner 16 is in the state electrostatically bonded to the carrier 17. Since the carrier 17 is being inhibited from passing through the gate part by the magnetic field, the toner 16 can not be moved past through the gate part. In this manner, the two-component developer is prevented from flowing out from the area of the gate member.

As the carrier 17 and toner 16 are moved, a frictional electrocity acts on them. Therefore, only a necessary amount of toner 16 is allowed to pass through the gate member. No excess amount of toner can pass through it.

When a voltage is applied to the gate electrode 21 from the signal source 22, a current flows from the electrode 21 to the toner through the carrier 17 and the charge potential of the toner in the vicinity of the electrode increases. At the same time, by the applied voltage to the electrode, the conductive cylinder of the toner carrying member 14 is charged with the opposite polarity charge to that of the toner through the thin insulating layer on the surface of the carrying member. As a result, the charge in the insulating layer forms an electric field and an electrostatic attraction force acts on the toner 16. The attraction force overcomes the toner binding force by the frictional charge between toner 16 and carrier 17. Thus, the toner 16 adheres to the toner carrying member thereby forming a toner image on the carrying member. With the smaller thickness of the insulating layer on the toner carrying member, the stronger electrostatic attraction force can be obtained even when the applied voltage is low, which is the same to the first embodiment. Therefore, the preferred range of the thickness of the insulating layer is several microns to several 10 microns at most. As to preferred materials, forming methods and characteristics of the insulating layer, the description previously made in connection with the first embodiment is also applicable to the second embodiment.

The toner image formed on the carrying member 14 is transferred onto a recording member such as transfer paper 24 under the action of suitable known transfer means such as corona discharger 23 or electrode roller, and then the transferred image is fixed for final use.

In the above shown apparatus, it is required to prevent unnecessary toner 16 and carrier 17 from flowing out from the area of the gate member 19 at all times except during image formation. To this end, a voltage of the polarity opposite to that of the signal voltage applied to the gate electrode at recording may be applied to the gate electrode at times other than the recording time.

To assist in better understanding of the embodiment, a concrete example thereof is now given:

As the toner 16 there was used the toner for NP-5000 (trade name) supplied by Canon Sales Co., Inc. As the magnetic carrier 17 there was used commercially available iron powder coated with teflon. The particle size of the carrier was 200 to 400 mesh. The gate electrode 8 was formed of piano wire of 80 microns in diameter. The piano wires were arranged in a row at the density of 10 wires per lmm and bonded together with epoxy bonding agent into an array of electrodes. As another forming method of the electrode array, there may be used also the known etching technique. In this case, a thin layer of magnetic material is formed on a resin plate at first and then a number of electrodes arranged at regular intervals are formed by etching the magnetic layer. The gap size between the gate electrode array 21 and the toner carrying member 14 is so selected as to allow the toner to pass through the gap which is generally in the range of 15 to 500 microns. In this example, the gap size was 100 microns. By using the smaller gap size the smaller particle size of toner can be used to improve the resolution of the formed image. The density of magnetic flux of the stationary magnet 15 was about 850 gauses at the area above the toner carrying member 14.

Under the above given conditions the toner carrying member 14 was driven to move it at the linear speed of 100 mm/sec. To record an image, about −200 V was applied to the individual electrodes 21 from the signal source 22 selectively according to the image to be recorded. In this manner, a toner image was formed on the toner carrying member 14. At non-recording time, about +100 V was continuously being applied to the gate electrode for the reason previously described. In this example, a sharp and clear image was obtained without fogging. The toner image thus formed on the carrying member was transferred onto the transfer paper 24 and then the transferred image was fixed to the transfer paper by a conventional fixing means.

As readily understood from the foregoing, since the use of dry developer is possible also in the second embodiment, there are obtained good images of higher sharpness than those obtained according to the prior art. The use of particulate developer brings forth a further advantage of easy handling.

The percentage of the magnetic carrier component in the two-component developer may be reduced to the extent that the carrier is present only in the area near the gate member. In this case, only the toner without carrier can be supplied to the container 18. Since the amount of carrier is small, when the toner is consumed by recording, the supply of toner to the area near the gate is performed rapidly, which meets the requirement for high speed recording.

In the shown embodiment, magnetic field generating means for inhibiting the outflow of developer from the gate part has been provided within the toner carrying member 14. However, if desired, another magnetic pole of the opposite polarity to that of the magnetic pole provided within the member 14 may be provided also on the side of the signal electrode 21. For example, such magnetic pole may be given to the electrode 21 itself or a magnet may be provided in the part of the container 18 or electrode 21 in the vicinity of the gate part along the width of the gate.

As previously described with reference to FIG. 2, the effect to prevent the outflow of developer can be improved by suitably selecting the inclination of the formed magnetic field. As for the second embodiment, the effect to prevent the outflow of developer in the container 18 from the gate part can be improved by using the arrangement shown in FIG. 4.

Figure 4:
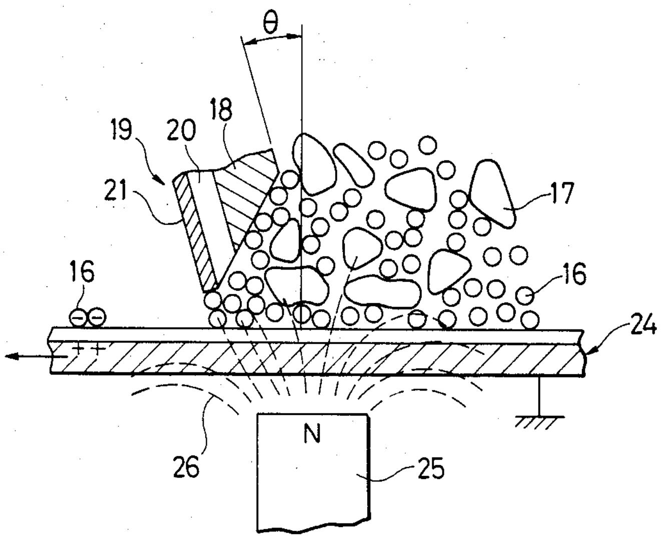
FIG. 4 is a partly enlarged sectional view of the gate part of the second embodiment.

In FIG. 4, broken lines 26 indicate the lines of magnetic force. The magnetic pole N of the stationary magnet 25 is opposed to the magnetic electrode 21 through the toner carrying member 14. However, the pole N is not in the position rightly opposed to the electrode 21 but in the position shifted from the right opposition toward the accumulation of developer. The direction of the magnetic lines is somehow inclined. as seen in FIG. 4. More particularly, the magnet 25 and the electrode 21 of the gate member are arranged in the relation that the magnetic field is inclined in the counter direction to the moving direction of the toner carrying member. With increasing the inclination, the effect to prevent the outflow of the developer becomes larger. However, as described above, when the inclination is too large, the carrier particles join together to form a long chain of particles along the magnetic field and the current is apt to flow along the chain of carrier particles when the signal voltage is applied to the gate electrode. Therefore, when the chain of carrier particles is too long it is required to increase the applied voltage. Furthermore, when the inclination of the magnetic field is large, the movement of carrier becomes difficult and therefore the desired rapid supply of the toner to the gate part becomes impossible. Considering these limitations it has been found that the inclination $\theta$ of the magnetic field should be selected preferably in the range of 0° to 60° and more preferably 30° to 45°.

As the carrier, a magnetic carrier has been particularly shown in the above. However, it is to be understood that there may be used also dielectric carriers such as particles of dielectric resin and glass. In this case, the outflow of the carrier from the gate part may be attained in the following manner:

The gap size between the gate member and the toner carrying member is generally set in the range of from 60μ to 400μ. On the other hand, the particle size of resin or glass used as carrier is elected to be in the range of from 60μ to 600μ which is larger than the gap size.

The arrow A in FIG. 3 indicates the path of circulation of such carrier. As seen from it, the carrier does not come near the gate opening but moves along the knife edge inside of the gate member. Therefore, in the area between the gate member and the toner carrying member there appears always such carrier containing toner, which assures the formation of images always having uniform quality.

In the case of magnetic carrier composed of iron particles or the like, the magnetic field formed between the gate member and the stationary magnet sufficiently prevents the outflow of the developer toward the toner carrying member. Further, when the stationary magnet and the gate member have been arranged to keep the above-mentioned positional relation, good circulation of the developer takes place in the hopper so that at the area near the gate member there is present always toner containing carrier.

In the embodiment shown in FIG. 3, the carrying member itself may be used as a recording member. In this case, the toner image formed on the carrying member is directly fixed thereto without transferring. However, it is also possible to transfer the toner image onto a separate transfer material and fix the toner image to the transfer material. As to the mixture of toner and carrier as used in the embodiment, it is recommendable that the flowability be high and the carrier should have good insulating property. To completely prevent unintentional outflow of the toner component from the gate member, a bias voltage may be applied to the gate electrode. In this case, the polarity of the bias voltage applied at non-recording time is opposite to that of the applied voltage at recording time. When such bias voltage is not used, the outflow of the toner component can be prevented well by the magnetic field formed at the gate part.

In case of the apparatus in which the magnetic field formed at the gate part is used to prevent the outflow of magnetic carrier or magnetic toner, the magnetic field is generated between the magnetic pole of the stationary magnet 2 or 15 and the comb-like magnetic electrode 8 or 21. Consequently, the magnetic field concentrates on the individual magnetic electrodes 8 and the magnetic field between the individual electrodes becomes weak.

Figure 5:
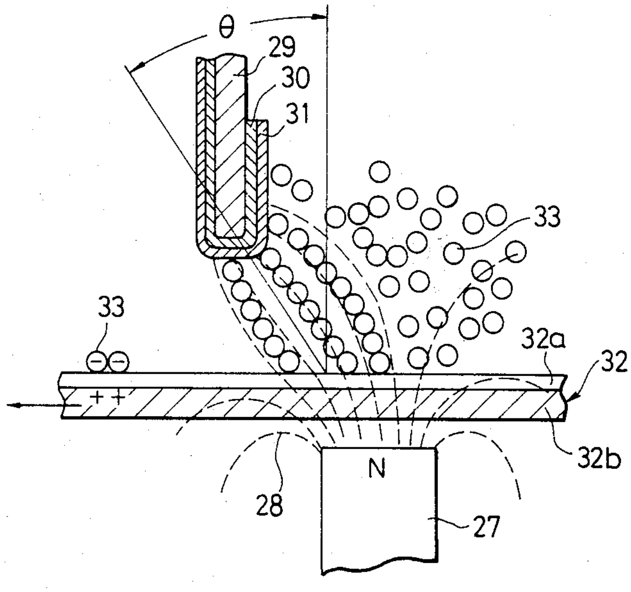
FIGS. 5 and 6 illustrate modifications of the gate part.

This problem may be solved by a modification of the gate part as shown in FIG. 5.

Hereinafter, the modification will be described in connection with the case wherein as the developer a magnetic toner is used (the magnetic toner will be hereinafter referred to briefly as toner).

In FIG. 5, 27 is a stationary magnet, 28 is magnetic field and 32 is a toner carrying member. The toner carrying member 32 comprises an insulating thin layer 32*a* facing the gate electrode and a non-magnetic support 32*b* facing the magnet. The gate member used in the invention as previously described should be designed so as to satisfy the requirement that it can prevent the unintentional outflow of toner from the gate member without hindering the rapid supply of toner for the consumed toner on the upstream side of the gate in recording. If the requirement is only to prevent the outflow of toner, then it will be perfectly satisfied by increasing the inclination of the magnetic field 28 indicated by the broken lines in FIG. 5. Although the outflow of toner is perfectly inhibited by it, the supply of toner for the consumed part becomes imperfect at the same time. This problem has been discussed in the above.

According to the modification shown in FIG. 5, this problem is solved by providing a magnetic body 29 at the gate part. The magnetic body 29 extends continuously in the direction of the width of the toner carrying member 32. 30 is an insulating layer and 31 is an electrode. The electrode 31 is divided into many individual electrode elements formed by etching and arranged in the direction of the record width. As shown in FIG. 5, the insulating layer 30 and the divided electrode 31 are bonded together in layers. The lamination comprising the insulating layer 30 and the electrode 31 is bonded to the magnetic body 29 in such manner as to cover the fore end part of the magnetic body 29 with the lamination.

As compared with the embodiment shown in FIG. 1, this modification has the following advantages:

In the first embodiment, the electrode part has been formed of magnetic material and the opposed magnetic pole to the stationary magnetic pole has been provided by the magnetic electrode part which is not continuous. In contrast, according to the now shown embodiment, a continuous opposed magnetic pole is provided. In the first embodiment, the magnetic field for preventing the outflow of toner has been produced depending only on the magneticity of the electrodes to which signal voltages are applied. As compared with the volume of the magnetic body opposed to the stationary magnetic pole in the first embodiment, the magnetic body 29 in the modification has a larger volume which serves to further intensify the magnetic field at the fore end part of the gate and, therefore, to further improve the ability to prevent the outflow of toner. In this modification, the material for the electrode 31 may be magnetic or non-magnetic.

Figure 6:
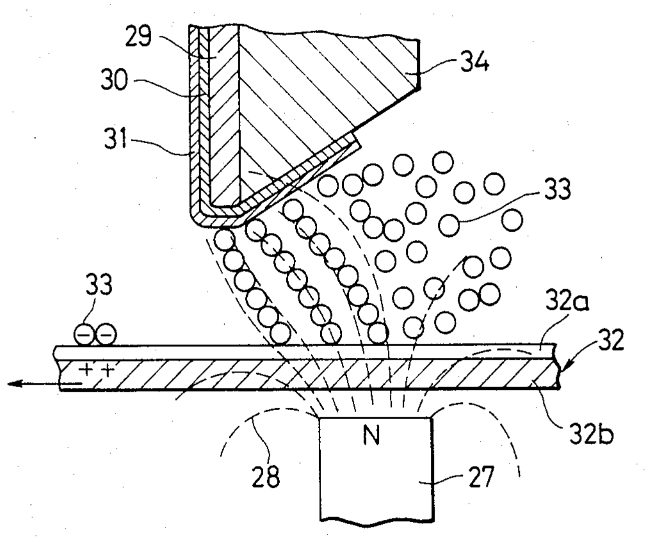

FIG. 6 shows a further modification of the gate part.

Similarly to the above modification, the electrode 31 is bonded to the magnetic body 29 in such manner as to cover the fore end part of the latter with the former. When an image signal voltage is applied to the electrode 31, not only the outlet portion of the gate but also the toner inside of the gate outlet are charged so that the toner adheres to the toner carrying member. As a result, the toner moves toward the outlet of the gate together with the toner carrying member. Therefore, high density images can be obtained. Furthermore, after the toner has been moved, there appears a vacant space at the area near the inside of the gate part, which accelerates the supply of toner for the consumed part by recording. Thus, good and rapid toner supply is assured.

When the signal voltage to the electrode 31 is cut off, the charge on the toner inside of the gate is discharged through the electrode. Therefore, even the toner existing in the area remote from the outlet of the gate never flows out as an image after stopping the application of the signal voltage.

In the modification shown in FIG. 6, the toner supply is further accelerated by a wedge-shaped member 34 provided at the gate part. By providing the wedge-shaped member 34, the force intending to move the toner toward the outlet of the gate with the movement of the toner carrying member 32 can be produced very easily at the inside of the gate member. The wedge-shaped member 34 may be formed of a magnetic material similar to the magnetic body 29. It is also possible to form the member 34 using the same material as the magnetic body 29 and assemble the two members 34 and 29 into one magnetic body.

The modifications shown in FIGS. 5 and 6 are applicable also to the apparatus according to the first embodiment shown in FIG. 1 wherein a cylindrical toner carrying member enclosing a stationary magnet 2 has been used.

Figure 7:
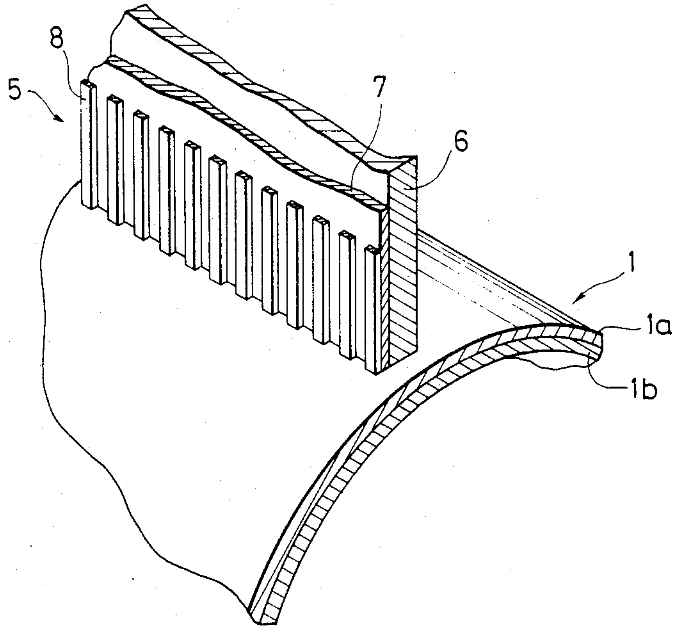
FIG. 7 is a partly enlarged perspective view of the gate part shown in FIG. 1.

FIG. 7 is a schematic enlarged view of the gate part shown in FIG. 1. As clearly shown in FIG. 7, the individual electrodes 8 arranged at regular intervals on the insulating layer 7. According to the image to be recorded, the signal source (not shown) applies a signal voltage to the individual electrodes 8 selectively and image-wisely.

As readily understood from the foregoing, the present invention has many advantages over the prior art.

According to the invention, dry toner can be used as the developer for recording. The dry toner is easy to handle and involves no problem of spreading of liquid carrier into the recoding material. Further, according to the invention, the recording signal is applied directly to the developer. Therefore, the recording can be performed with the application of lower voltage than the prior art apparatus. In addition, the resolution is improved as compared with the prior art. In recording, only a necessary amount of toner is flowed out from the accumulation of toner, which has an effect to eliminate fogging. A magnetic field can be used to prevent the unintentional outflow of developer. In this case, any particular power source is not required to be provided, which reduces the cost for operation and maintenance of the apparatus.

While the invention has been particularly shown and described with reference to preferred embodiments thereof, it will be understood by those skilled in the art that the foregoing and other changes in form and details can be made therein without departing from the spirit and scope of the invention.

What we claim is:

1. Apparatus for forming images using particulate developer containing a magnetic component, comprising:

a container for accumulating the particulate developer containing a magnetic component;

image holding means disposed to pass said container while contacting the developer in said container;

gate means having a number of electrodes arranged in the direction of the record width and electrically isolated from each other, said gate means having a magnetic property and being provided at an outlet side of said container;

magnetic force generating means disposed at a position opposed to said gate means such that image holding means passes therebetween; and means for applying a signal voltage to said electrodes of said gate means to correspond to information to be recorded;

wherein during non-recording the outflow of the developer from said container is blocked by the magnetic field formed between said gate means and said magnetic force generating means and during recording said signal voltage is applied to the electrodes of said gate means to adhere the developer to said image holding means and form a record image corresponding to the information to be recorded by enabling the developer to move out from said container against the magnetic field.

2. Apparatus as set forth in claim 1, wherein said developer is electroconductive magnetic toner.

3. Apparatus as set forth in claim 1, wherein said developer is dielectric magnetic toner.

4. Apparatus as set forth in claim 1, wherein said image holding means is in the form of a drum for repeating use and the developer image formed thereon is transferred to another member.

5. Apparatus as set forth in claim 1, wherein said image holding means is in the form of a sheet and the developer image formed thereon is fixed to said image holding means.

6. Apparatus as set forth in claim 1, wherein said developer is magnetic toner.

7. Apparatus as set forth in claim 1, wherein said developer contains magnetic carrier and toner.

8. Apparatus as set forth in claim 1, wherein said electrodes of said gate means are of magnetic material.

9. Apparatus as set forth in claim 1 or 8, wherein said gate means has a magnetic member extending over the whole record width.

10. Apparatus according to claim 9, wherein said electrodes of said gate means are provided to cover the leading end part of said magnetic member.

11. Apparatus for forming images according to claim 1, wherein said gate means has a leading end surface which gradually decreases the clearance between said gate means and said image holding means in the direction of movement of said image holding means.

* * * * *